United States Patent
Rowles et al.

(10) Patent No.: US 8,819,427 B2
(45) Date of Patent: Aug. 26, 2014

(54) DEVICE SPECIFIC SECURE LICENSING

(75) Inventors: Noah Tilman Rowles, Pasadena, CA (US); Daniel Harlan Hawks, University City, MO (US); Dennis Barry Bottrell, La Crescenta, CA (US)

(73) Assignee: iolo technologies, LLC, Los Angeles, CA (US)

( * ) Notice: Subject to any disclaimer, the term of this patent is extended or adjusted under 35 U.S.C. 154(b) by 0 days.

(21) Appl. No.: 13/524,297

(22) Filed: Jun. 15, 2012

(65) Prior Publication Data

US 2013/0339731 A1 Dec. 19, 2013

(51) Int. Cl.
*H04L 9/32* (2006.01)

(52) U.S. Cl.
USPC .............. 713/168; 709/201; 709/203

(58) Field of Classification Search
CPC ............... H04L 9/3213; H04L 9/3228
USPC .................. 713/168; 709/201, 203
See application file for complete search history.

(56) References Cited

U.S. PATENT DOCUMENTS

| | | | |
|---|---|---|---|
| 6,061,791 A * | 5/2000 | Moreau | 713/171 |
| 8,528,067 B2 | 9/2013 | Hurry et al. | |
| 2004/0153658 A1* | 8/2004 | Gunyakti et al. | 713/193 |
| 2004/0260765 A1* | 12/2004 | Re et al. | 709/202 |
| 2007/0256144 A1* | 11/2007 | Hoffman et al. | 726/28 |
| 2011/0167503 A1* | 7/2011 | Horal et al. | 726/33 |
| 2012/0060228 A1* | 3/2012 | Katkar | 726/33 |
| 2012/0216269 A1 | 8/2012 | Yeung et al. | |

* cited by examiner

*Primary Examiner* — Kambiz Zand
*Assistant Examiner* — Abiy Getachew
(74) *Attorney, Agent, or Firm* — Brokaw Patent Law PC; Christopher J. Brokaw

(57) ABSTRACT

Device-specific secure software licensing techniques are disclosed. In various embodiments, a key/token pair associated with a client requesting license validation is received. It is determined whether the key/token pair matches an entry in a store of currently valid key/token pairs. An affirmative response is sent in the event the key/token pair matches a corresponding entry in the store of currently valid key/token pairs.

16 Claims, 10 Drawing Sheets

Encrypted File at Device A — 602

| Activation Key | Token | Next Check |
|---|---|---|
| AAAAAAAAAAAA | 1111111111111111 | 06/30/12 |

Encrypted File at Device B — 606

| Activation Key | Token | Next Check |
|---|---|---|
| AAAAAAAAAAAA | 2222222222222222 | 07/01/12 |

604

| Activation Key | Token | Next Check |
|---|---|---|
| AAAAAAAAAAAA | 1111111111111111 | 06/30/12 |
| AAAAAAAAAAAA | 2222222222222222 | 07/01/12 |

FIG. 6B

Encrypted File at Device A — 608

| Activation Key | Token | Next Check |
|---|---|---|
| AAAAAAAAAAAA | 3333333333333333 | 07/02/12 |

Encrypted File at Device B — 606

| Activation Key | Token | Next Check |
|---|---|---|
| AAAAAAAAAAAA | 2222222222222222 | 07/01/12 |

604

| Activation Key | Token | Next Check |
|---|---|---|
| AAAAAAAAAAAA | 3333333333333333 | 07/02/12 |
| AAAAAAAAAAAA | 2222222222222222 | 07/01/12 |

FIG. 6C

DEVICE SPECIFIC SECURE LICENSING

BACKGROUND OF THE INVENTION

Software intended to be licensed on a per-device basis is vulnerable to device "mirroring" which confuses existing licensing methods that use local device serial numbers or other internal IDs (that can be mirrored) for control. License methods that require manual login authentication and attempt to track or control concurrent use are prone to user error (forgetting/mistyping login credentials), cumbersome user requirements (login/password/email management and loss), and false controls (legitimate use incorrectly delayed or restricted).

BRIEF DESCRIPTION OF THE DRAWINGS

Various embodiments of the invention are disclosed in the following detailed description and the accompanying drawings.

FIGS. 6A-6E illustrate an example in which volatile tokens are used to prevent unauthorized use of licensed software at a mirrored or otherwise cloned system.

DETAILED DESCRIPTION

Figure 1:
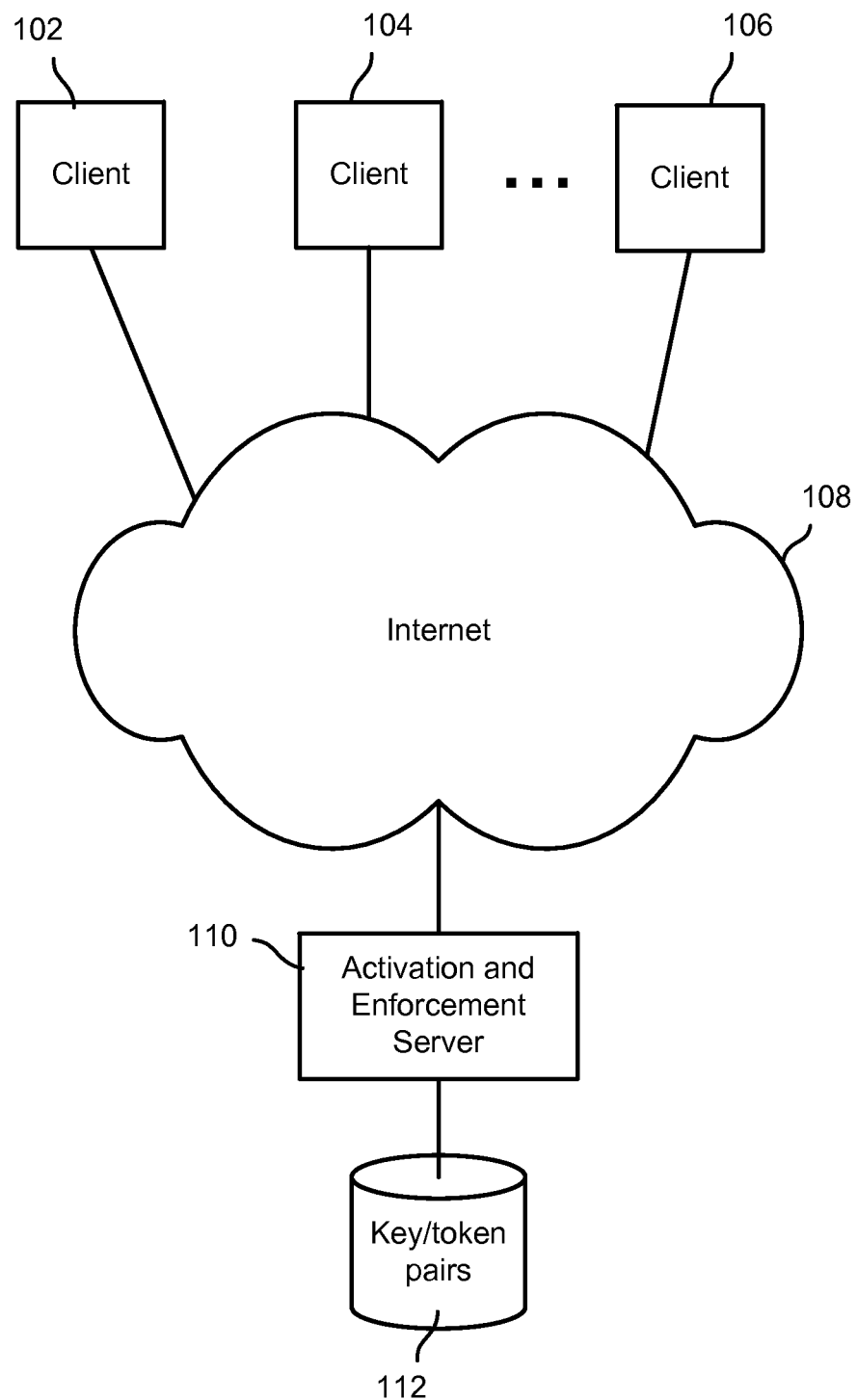
FIG. 1 is a block diagram illustrating an embodiment of a device-specific licensing system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An automatic and transparent method of administering 1:1 device/software licensing that uses opportunistic remote communication and volatile token/key pairing is disclosed. In various embodiments, an activation key that is valid to install licensed software on a prescribed number of devices is provided. A license enforcement server provides to each client or other device on which the software is installed, up to the prescribed number, a volatile token and a next check date/time. At the appointed next check date/time, the volatile token is sent to the license enforcement server, for example as an activation key/token pair. If the key/token pair is found at the server, continued access to the software is permitted, and the old token is replaced by a newly-generated one, which is sent to the client or other device. No inherently unique device ID is required. If the device and/or device data is mirrored, or the identity of the device spoofed, only one device will have the currently valid token once a post-mirroring or spoofing access has been allowed, enabling the attempted fraudulent use to be detected when a second device tries to use a token that has been used and replaced already.

FIG. 1 is a block diagram illustrating an embodiment of a device-specific licensing system. In the example shown, a plurality of clients (or other devices) represented in FIG. 1 by clients 102, 104, and 106 are connected via the Internet 108 to a software license activation and enforcement server 110. The server 110 uses activation/key token pairs stored in a key/token pair database 112 to enforce device-specific licenses. For example, if an activation key entitled a holder to install licensed software on three devices, such as clients 102, 104, and 106, then the server 110 would generate and store in database 112, for each client, an activation key/volatile token pair. Each client would be configured, for example by operation of the licensed software at startup, opportunistically as network connectivity is available, and/or at a date/time indicated by the server 110, to send back to server 110 a copy of the activation key/token pair received most recently from the server 110. If the server 110 finds that activation key/token pair in the database 112, continued access to and use of the licensed software by that client is permitted. If not, the server 110 takes responsive action, such as blocking and/or restricting use of and/or access to the licensed software by some or all clients associated with the affected activation key, or notifying a $3^{rd}$ party.

Figure 2:
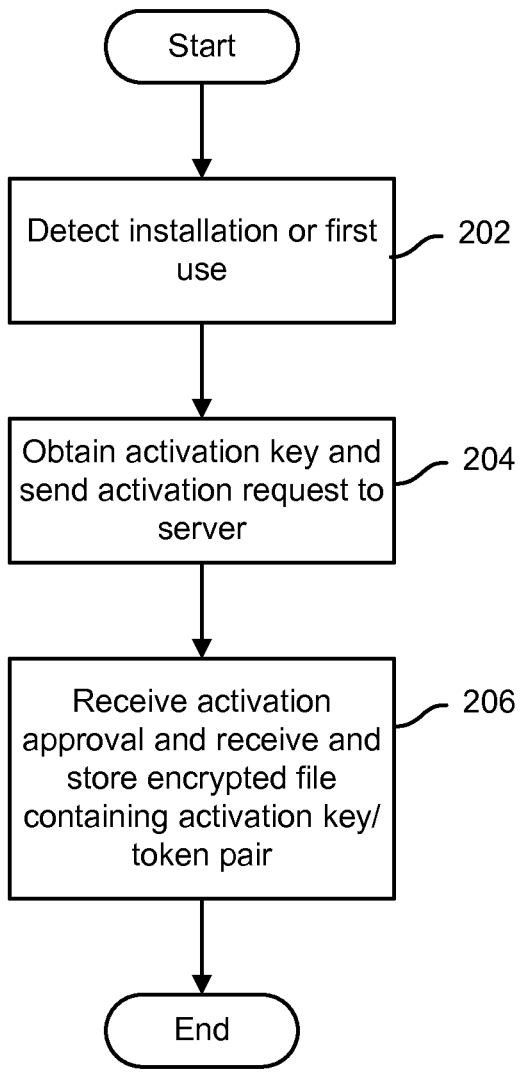
FIG. 2 is a flow chart illustrating an embodiment of a process to activate a software license.

FIG. 2 is a flow chart illustrating an embodiment of a process to activate a software license. In various embodiments, the process of FIG. 2 is performed at a client or other device, for example upon installation and/or first use of licensed software at the client or other device. In the example shown, installation and/or first use of the licensed software is detected (202), for example by the software itself. An activation key is obtained, for example via a graphical or other user interface at the device, and an activation request that includes the key is sent to a remote activation server (204). An activation approval is received from the server (206). The approval includes and/or is accompanied by an encrypted file that includes, in encrypted form, the activation key and a volatile token, along with an "next check" date/time by which a subsequent license validation check should (or in some embodiments must) be performed.

Figure 3:
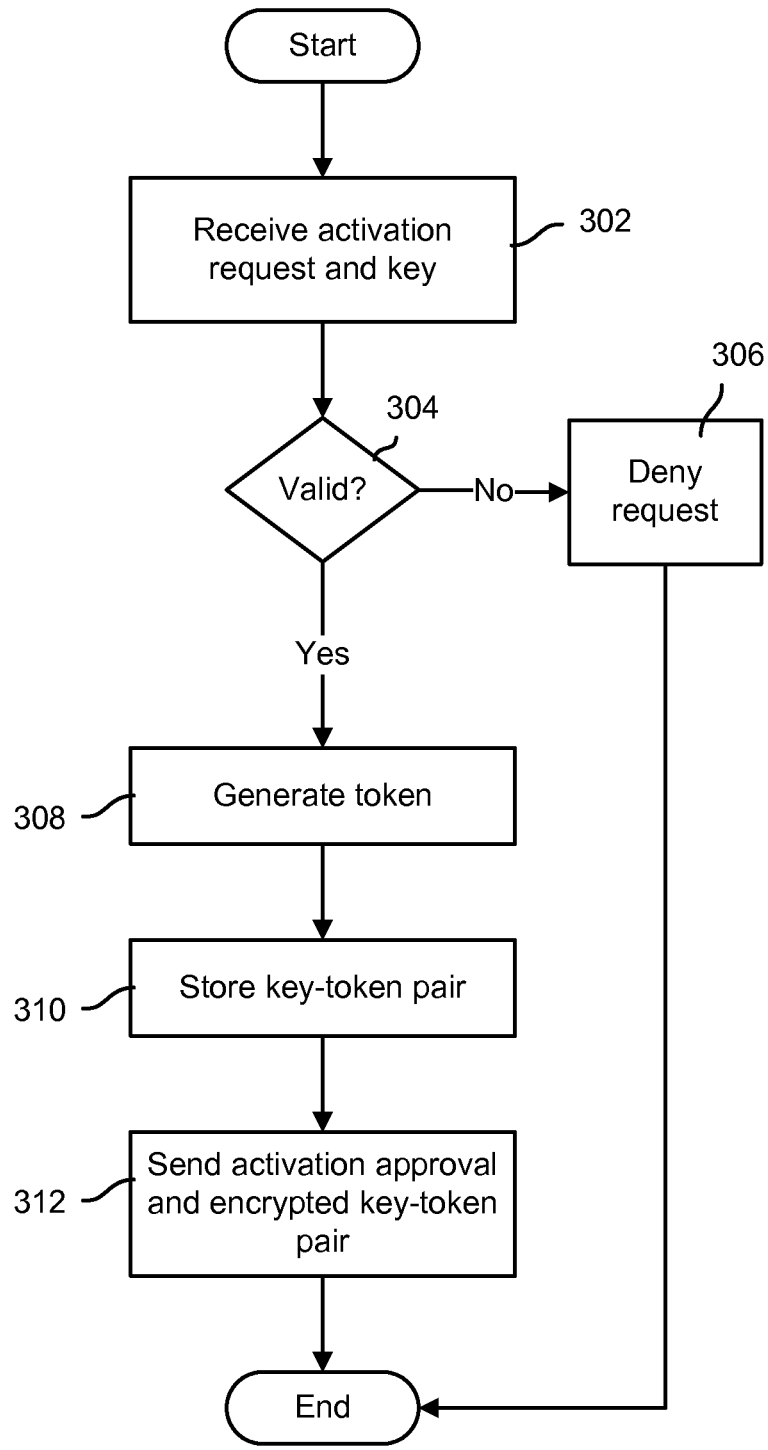
FIG. 3 is a flow chart illustrating an embodiment of a process to activate a software license, from the perspective of an activation server.

FIG. 3 is a flow chart illustrating an embodiment of a process to activate a software license, from the perspective of an activation server. In the example shown, an activation request and associated activation key are received (302). It is determined whether the activation key is valid for the requested activation (304). For example, an activation key may be valid for use to install and activate the software on a prescribed number of systems. If the request is not valid, for example, the activation key already has been used the prescribed number of times (304), then the request is denied (306). If the key is valid (304), a unique token is generated (308), for example at random, the activation key and token are stored at the server as a valid key/token pair (310), and an activation approval is sent to the requesting system, including and/or accompanied by an encrypted file that includes the key/token pair and a "next check" date/time (312).

Figure 4:
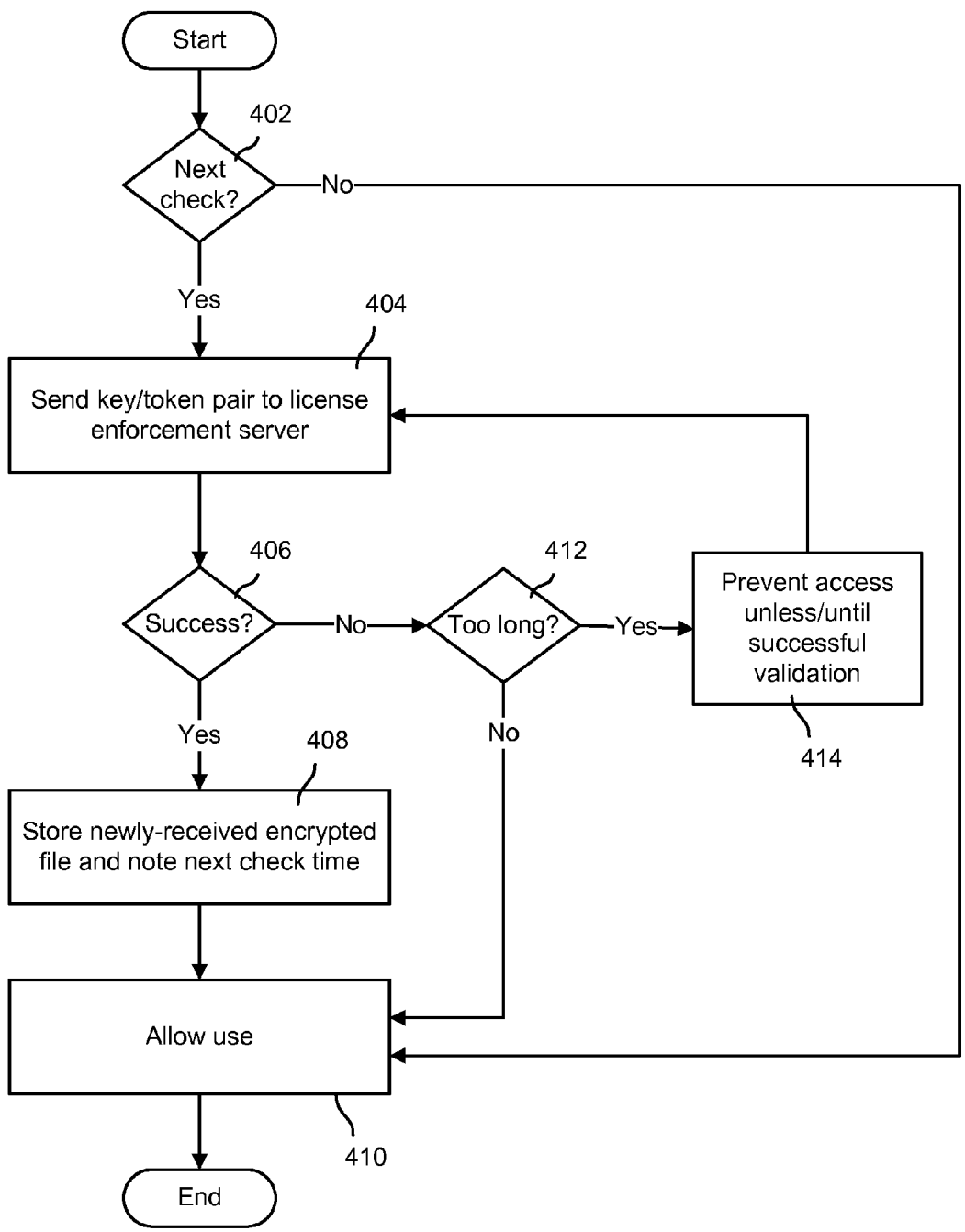
FIG. 4 is a flow chart illustrating an embodiment of a process to validate opportunistically the continued validity of a software license.

FIG. 4 is a flow chart illustrating an embodiment of a process to validate opportunistically the continued validity of a software license. In the example shown, periodically, when network connectivity is or becomes available, at a random interval, and/or upon accessing the licensed software, it is determined whether it is time to perform a "next check" of continued validity of the software license (402). In various embodiments, the check is performed opportunistically, without interfering (at least initially) with access to or use of the licensed software. In various embodiments, checks are performed at startup and/or when network connectivity is or becomes available. The check is performed in some embodiments at an opportunity sometime prior to a "next check" date/time specified in the most recent activation/validation response received at the system. If the time to perform an opportunistic or other "next check" has not arrived (402), access and/or continued access is allowed (410). If the time to perform a check has arrived (402), the previously-stored encrypted file is sent to the activation/validation server (404). In some alternative embodiments, the previously-stored encrypted file is accessed and decrypted at the client, and the activation key/token pair contained therein is sent to the activation/validation server (404). In some such embodiments, if an attempt to access and/or interfere with the communication of the key/token pair from the client to the server is detect, the validation attempt automatically fails. If a response confirming continued validity of the license is not received (406), it is determined whether too much time has passed since the last successful connection to and validation by the server (412). In some embodiments, the determination is based at least in part on the "next check" date/time received most recently from the server. If it has not been too long since the last successful validation (412), in the example shown continued access and use are permitted (410), even though the license could not at that time be validated. However, if no response to the current attempt to validate is received (406) and too much time has passed since the last successful validation (412), then access is blocked (or restricted) at least until such time as a successful validation is completed (414). In this way, the licensed can be validated opportunistically, without delaying or blocking access or use of the software due to intermittent connectivity or other communication failures, server down time, etc. Even upon successive failures to connect, continued use is allowed, in various embodiments up to some limit at which point successful validation is required to continue to have (full) access to and use of the licensed software. In addition, the continued validity and valid term of the license can be confirmed from time to time without requiring the user to initiate, participate in, or know about any interactions with the activation/validation server.

Figure 5:
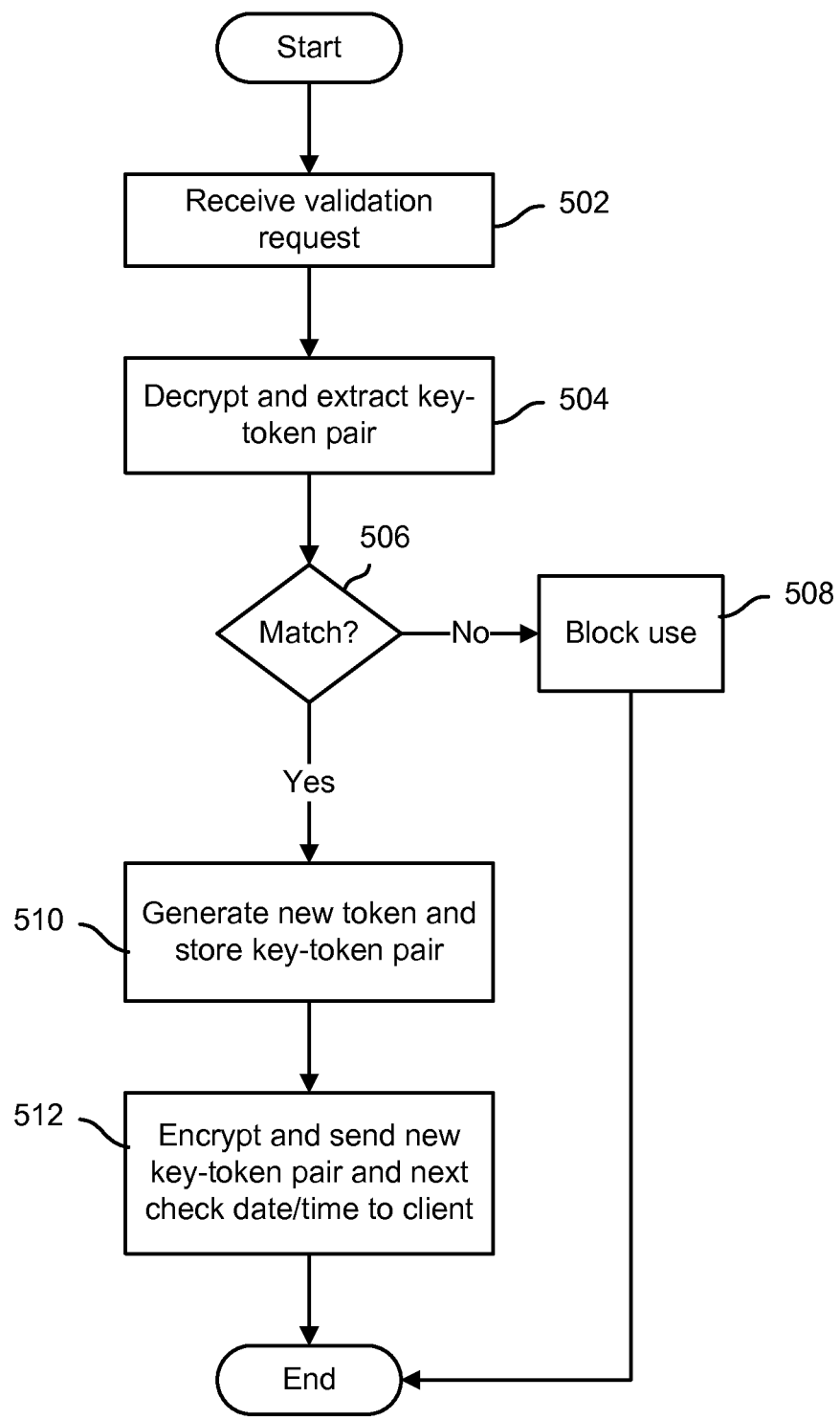
FIG. 5 is a flow chart illustrating an embodiment of a process to respond to requests to validate the continued validity of a software license, for example at an activation/validation server.

FIG. 5 is a flow chart illustrating an embodiment of a process to respond to requests to validate the continued validity of a software license, for example at an activation/validation server. A validation request is received (502) and decrypted to extract the activation key/token pair sent by the requesting system (504). If no match is found in the server-side database of valid key/token pairs (506), further use of the licensed software is blocked (or restricted) (508), for example by sending a response that causes the licensed software to block (or restrict) access. If the received key/token pair matches a pair stored at the server (506), a new volatile token is generated and the resulting key/token pair is stored at the server in place of the previous one (510), and the new key/token pair, along with a new "next check" date/time, is sent to the requesting client (512).

Figure 6A:
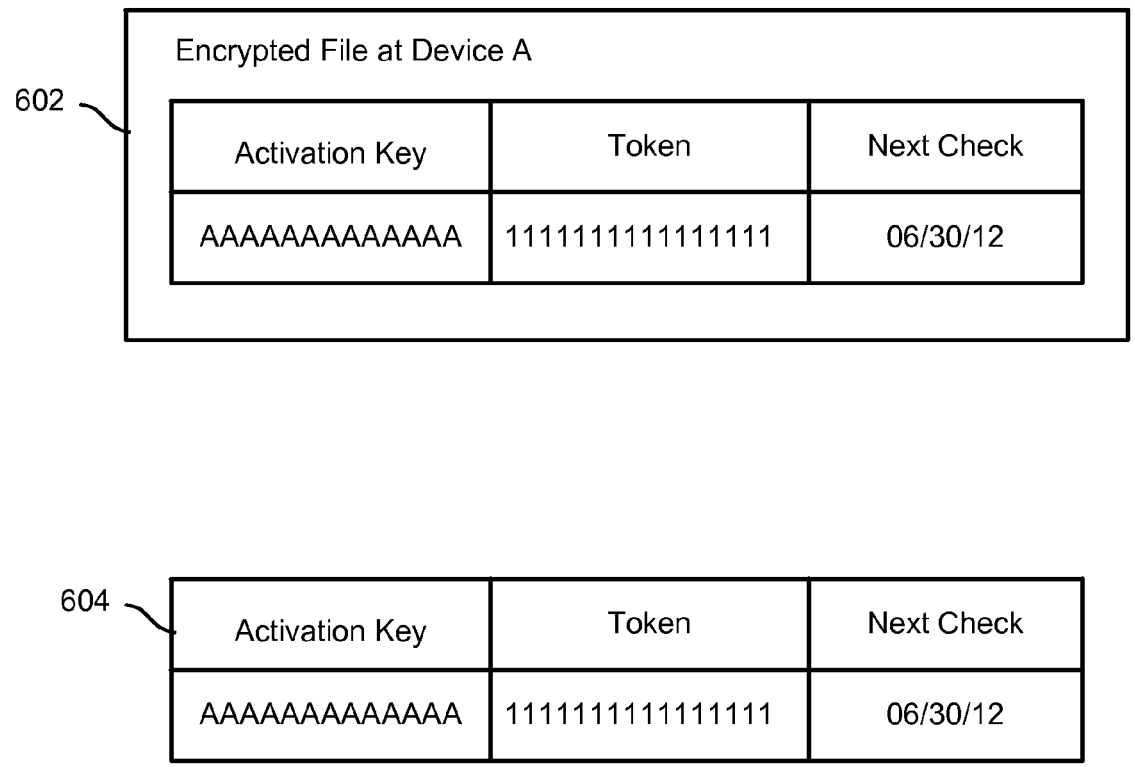

FIGS. 6A-6E illustrate an example in which volatile tokens are used to prevent unauthorized use of licensed software at a mirrored or otherwise cloned system. In the example shown, referring first to FIG. 6A, the license software has been installed and activated at a device A, resulting in the encrypted file 602 being stored at the device A and a database table 604 at the server side having the entry shown in FIG. 6A. FIG. 6B shows that a second device B has installed and activated the licensed software using the same activation key as device A, but a different token unique to device B has been generated and provided to device B, as indicated by the data in the encrypted file 606 on device B and the corresponding entry in table 604 at the server. FIG. 6C shows a state subsequent to a successful validation by device A of continued validity of its license to the software. Note that a new volatile token and "next check" date are included in a new encrypted file 608 received at device A from the server, and a corresponding entry with the new token has replaced the original entry for device A in the table 604. Note that the entry is not identified as being associated with device A or any unique identifier thereof, rather the currently valid and unique activation key/token pair that corresponds to the one stored on device A is stored in table 604.

Figure 6D:
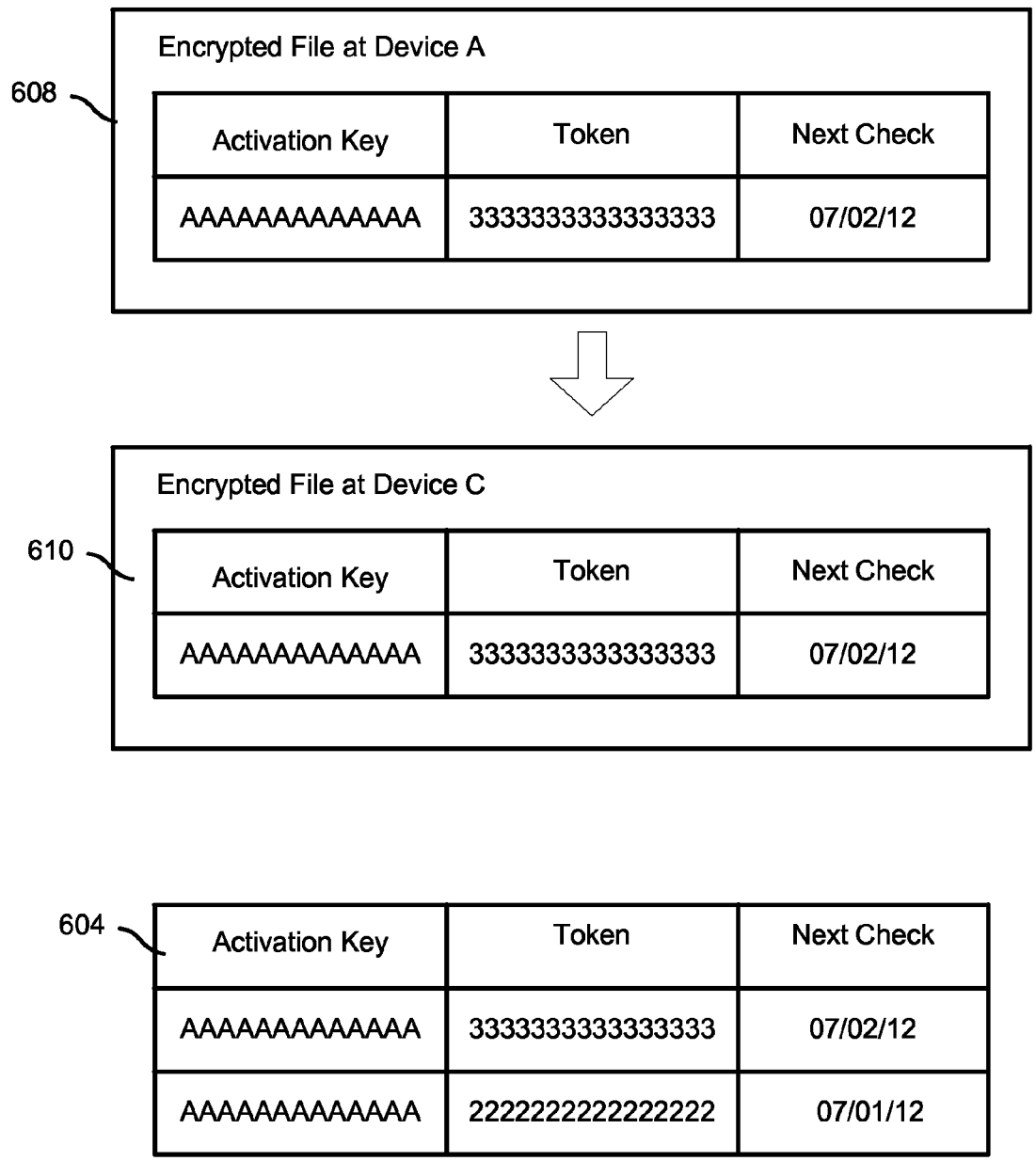
Figure 6E:
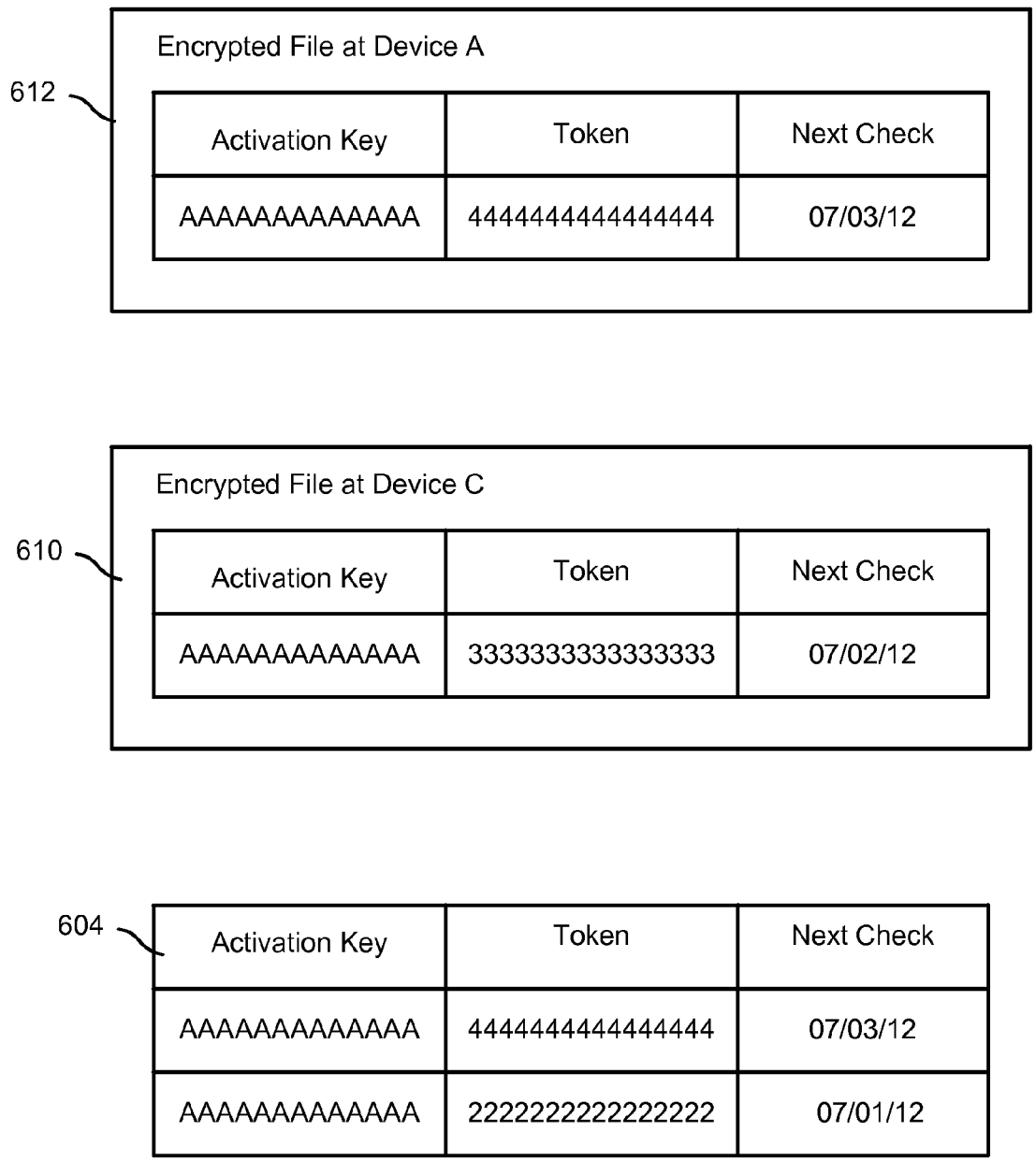

FIGS. 6D and 6E illustrate what would happen in the event the device A and/or its data were mirrored to another device C, for example in an illicit attempt to evade the license limit on the number of devices on which the licensed software may be installed. In the course of mirroring, for example, a copy 610 of the encrypted file 608 has been made and stored on device C, along with an unauthorized copy of the licensed software. Initially, the key/token pair as stored on both device A and device C is the same. The server side database table 604 continues to store only two valid key/token pairs for this activation key, originally as a result of authorized installation and use at devices A and B, as described above. FIG. 6E shows the state after a subsequent (i.e., post-mirroring) successful validation by device A. The key/token pair for device A has changed once again, as indicated by the token values in encrypted file 612 and the corresponding entry in table 604. A subsequent attempt by device C to validate would fail, because device C continues to have only the now superseded token that was copied from and was formerly valid for device A. If device C were to send this no longer valid key/value pair to the server, the server would not find a corresponding entry in the table 604 and would take responsive action, such as to block or otherwise restrict access to the licensed software on device C, and in some embodiments to act automatically or prompt an investigation to consider whether to block access by other devices using the same activation key.

Note that the technique disclosed herein would detect the unauthorized installation through mirroring, other copying, or identify spoofing, regardless of whether and/or how effectively the unauthorized system emulated the identity of the authorized system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of licensing software, comprising:
   receiving, at a server, a key-token pair associated with a client requesting license validation in response to the client (a) obtaining a network connection or (b) determining that the license validation is due based on the current day and time;
   determining that the key-token pair matches an entry in a store of currently valid key-token pairs;
   generating a new token based at least in part on the determination that the key-token pair matches the entry;
   replacing the entry with a new key-token pair including the new token; and
   sending to the client an encrypted file that includes (a) the new token and (b) a next check time, wherein the next check time defines a particular day and a particular time by which a next validation request should be sent to the server.

2. The method of claim 1, further comprising taking responsive action in the event the key-token pair does not match any entry in the store of currently valid key-token pairs.

3. The method of claim 1, wherein the key comprises an activation key.

4. The method of claim 3, further comprising receiving an activation request that includes the activation key; determining that activation is authorized; and generating and providing a response that includes the key-token pair.

5. The method of claim 1, further comprising configuring the client to request validation opportunistically without at least initially interfering with access to or use of the licensed software.

6. The method of claim 1, further comprising configuring the client to at least temporarily block or otherwise restrict access to or use of the licensed software in the event a successful validation has not been completed within a prescribed time.

7. The method of claim 2, wherein the responsive action includes blocking or otherwise restricting access to and/or use of the licensed software at the client.

8. The method of claim 2, wherein the responsive action includes blocking or otherwise restricting access to and/or use of the licensed software at clients associated with the key included in the key-token pair received from the client.

9. A license enforcement system, comprising:
   a communication interface configured to receive a key-token pair associated with a client requesting license validation in response to the client (a) obtaining a network connection or (b) determining that the license validation is due based on the current day and time; and
   a computer processor coupled to the communication interface and configured to:
      determine that the key-token pair matches an entry in a store of currently valid key-token pairs;
      generate a new token based at least in part on the determination that the key-token pair matches the entry;
      replace the entry with a new key-token pair including the new token; and
      send to the client an encrypted file that includes (a) the new token and (b) a next check time, wherein the next check time defines a particular day and a particular time by which a next validation request should be sent to the server.

10. The system of claim 9, wherein the processor is further configured to take responsive action in the event the key-token pair does not match any entry in the store of currently valid key-token pairs.

11. The system of claim 10, wherein the responsive action includes blocking or otherwise restricting access to and/or use of the licensed software at the client.

12. The system of claim 10, wherein the responsive action includes blocking or otherwise restricting access to and/or use of the licensed software at clients associated with the key included in the key-token pair received from the client.

13. A computer program product embodied in a tangible, non-transitory computer readable storage medium and comprising computer instructions for:
   receiving a key-token pair associated with a client requesting license validation in response to the client (a) obtaining a network connection or (b) determining that the license validation is due based on the current day and time;
   determining that the key-token pair matches an entry in a store of currently valid key-token pairs;
   generating a new token based at least in part on the determination that the key-token pair matches the entry;
   replacing the entry with a new key-token pair including the new token; and
   sending to the client an encrypted file that includes (a) the new token and (b) a next check time, wherein the next check time defines a particular day and a particular time by which a next validation request should be sent to the server.

14. The computer program product of claim 13, further comprising computer instructions for taking responsive action in the event the key-token pair does not match any entry in the store of currently valid key-token pairs.

15. The method of claim 1, further comprising configuring the client to at least temporarily block or otherwise restrict access to or use of the licensed software if a successful validation has not been completed prior to the next check time.

16. The system of claim 9, further comprising configuring the client to at least temporarily block or otherwise restrict access to or use of the licensed software if a successful validation has not been completed prior to the next check time.

* * * * *